United States Patent [19]

Lacey et al.

[11] 4,400,098

[45] Aug. 23, 1983

[54] BEARING ARRANGEMENTS

[75] Inventors: Stephen J. Lacey, Notts; Frank P. Wardle, Lincs; Thomas L. H. Walford, Newcastle upon Tyne; Samuel H. Knight; Anthony J. Kent, both of Notts; Kenneth E. Sharman, Lincs, all of England

[73] Assignee: Ransome Hoffmann Pollard Limited, Chelmsford, England

[21] Appl. No.: 329,881

[22] Filed: Dec. 11, 1981

[30] Foreign Application Priority Data

Dec. 15, 1980 [GB] United Kingdom ............... 8040143

[51] Int. Cl.³ .......................................... F16C 19/06
[52] U.S. Cl. .................................. 384/99; 308/187; 308/189 A
[58] Field of Search ............ 384/99; 308/187, 189 A, 308/189 R, 207 A, 195

[56] References Cited

U.S. PATENT DOCUMENTS

| | | | |
|---|---|---|---|
| 3,756,672 | 9/1973 | Hibner et al. | 308/189 A |
| 3,782,793 | 1/1974 | Sinner | 384/99 |
| 4,215,907 | 8/1980 | Pohl | 308/189 A |

Primary Examiner—Lenard A. Footland
Attorney, Agent, or Firm—Birch, Stewart, Kolasch & Birch

[57] ABSTRACT

A self-contained bearing unit rotatably supports a tool spindle in a bore of a machine tool housing wall. The unit employs an angular-contact ball bearing and the outer race is displaced axially to alter the pre-loading by supplying pressure fluid to a chamber containing a resiliently deformable seal or an annular bellows device.

14 Claims, 10 Drawing Figures

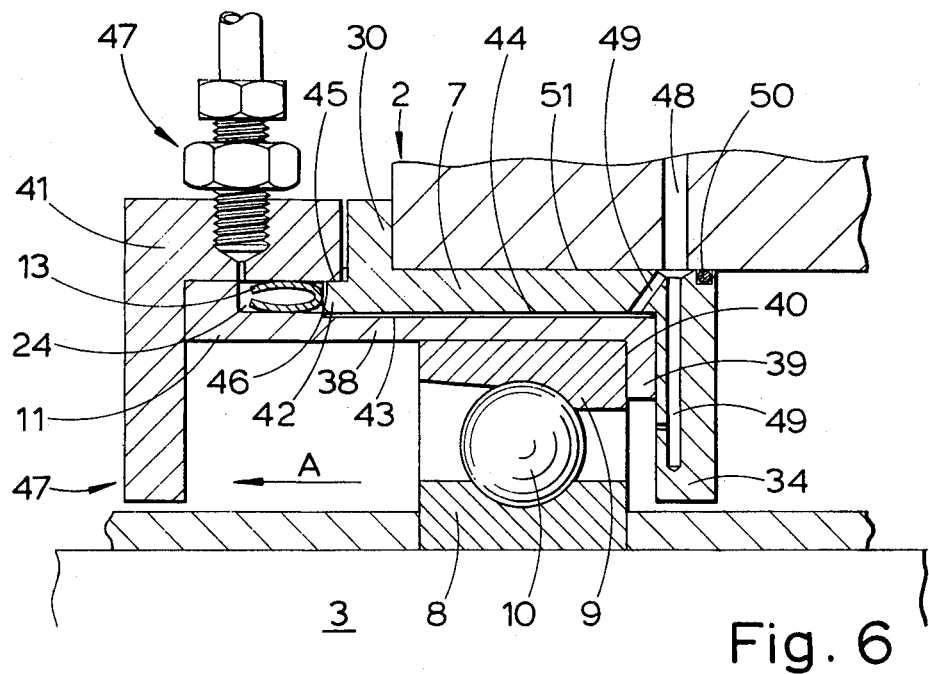
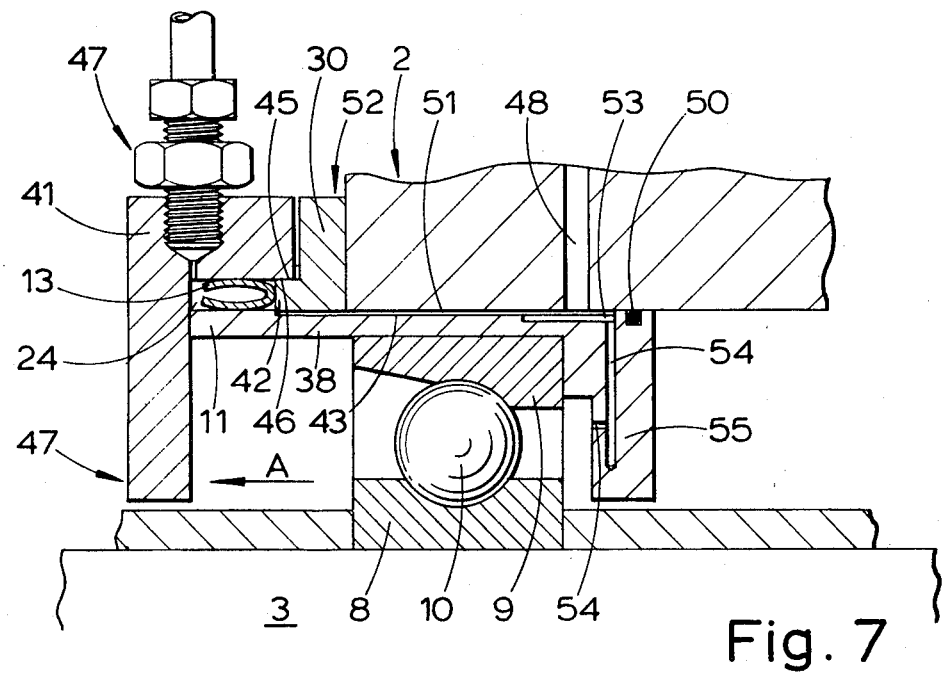

BEARING ARRANGEMENTS

BACKGROUND TO THE INVENTION

The present invention relates in general to bearing arrangements and more particularly to bearing units usable with the spindles of machine tools and capable of subjecting a bearing thereof to an adjustable axial pre-load force.

Various types of axial pre-loadable bearing arrangements have been adopted and proposed in the past but the present invention seeks to overcome various disadvantages which are encountered with the prior arrangements. More particularly, the invention seeks to provide a compact self-contained unit which can be easily fitted as a replacement for one of the bearing arrangements for the spindle of an existing machine tool.

SUMMARY OF THE INVENTION

The invention provides a self-contained bearing unit for direct location in a bore of a housing wall of a machine tool to supplement another bearing or bearings in rotatably supporting a spindle. The unit comprises an angular-contact ball bearing with inner and outer races, the inner race being fixedly rotatable with the spindle. Means, such as bores channels or passages, permits lubricant to be conveyed to the bearing. Means, such as a grub screw, restrains the outer race against rotation while permitting axial displacement thereof relative to the inner race and means defines an annular pressure-fluid-reception chamber independent of the bore in the housing wall. Pressure fluid is conveyed to said chamber, to adjust the axial pre-load force. In one aspect of the invention a resiliently deformable annular U-shaped seal is provided in the chamber. The seal is then subjected directly to the pressure fluid conveyed to the chamber which exerts an axial displacement force on the outer race to pre-load the bearing. According to another aspect of the invention the pressure fluid is not conveyed directly to the chamber but rather into an annular resilient bellows device disposed in the chamber instead of the seal. The bellows device then exerts an axial displacement force on the outer race to pre-load the bearing.

By using a bearing unit constructed in accordance with the invention, the dynamic stiffness of the associated tool spindle can be improved and further benefits can result by controlled adjustment of the axial pre-load force by hydraulic means.

The U-shaped seal can be made from a low friction plastics liner and spring steel. Such a seal can be moved to form an annular thrust piston which is overall deformably resilient or else such a seal can remain stationary and is used to create a reaction force to displace the outer bearing race. Similarly, with the bellows device: one end ring, for example, would remain stationary while another end ring moves outwardly therefrom by the resilient expansion of a concertina-like annular piece therebetween. The movement of the other end ring can then produce thrust or reactive force.

Both resilient components can provide inherent damping although a restriction in the pressure fluid flow path is useful to enhance this effect.

A sleeve or annular block may contact the bearing and be received in the machine tool housing wall bore. It is however, possible to locate the outer bearing race directly in this bore. The chamber which receives pressure fluid or which contains the bellows device which receives pressure fluid may be disposed within the bore, preferably in the sleeve, or externally thereof. In all the embodiments of the invention there are surfaces in sliding contact which are relatively displaced by the pressure fluid. These surfaces may be between the outer race and the sleeve or between the outer race and the bore or between the block fixed to the race and the sleeve or the bore. It is desirable to provide an additional passage, pocket or the like to enable the lubricant to be passed to the sliding surfaces as well as to the bearing.

Depending on the particular application the sleeve and/or block may contain separate bores through which the pressure fluid and the lubricant is passed. Radial or axial end face openings can provide access to these bores.

Usually the unit is especially compact smaller or no larger in width than the housing wall bore in which it is fitted and considerably smaller than the axial dimension of the spindle.

The invention may be understood more readily, and various other features of the invention may become apparent, from consideration of the following description.

BRIEF DESCRIPTION OF DRAWINGS

Embodiments of the invention will now be described, by way of examples only, with reference to the accompanying drawings, wherein:

FIGS. 6 to 9 are schematic sectional side views of further respective bearing units constructed in accordance with the invention.

DESCRIPTION OF PREFERRED EMBODIMENTS

Figure 1:
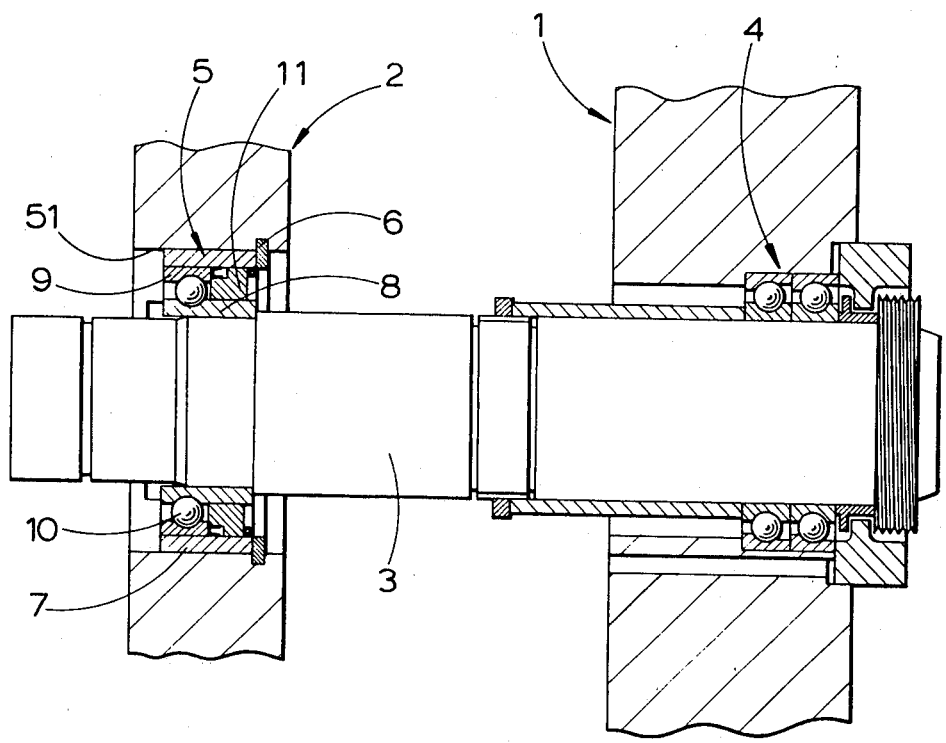
FIG. 1 is a part-sectional schematic side view of part of a housing of a machine tool utilizing a spindle supported by a bearing unit constructed in accordance with the invention.

Throughout the accompanying drawings and the following description like reference numerals are used to identify like or analogous parts.

Figure 2:
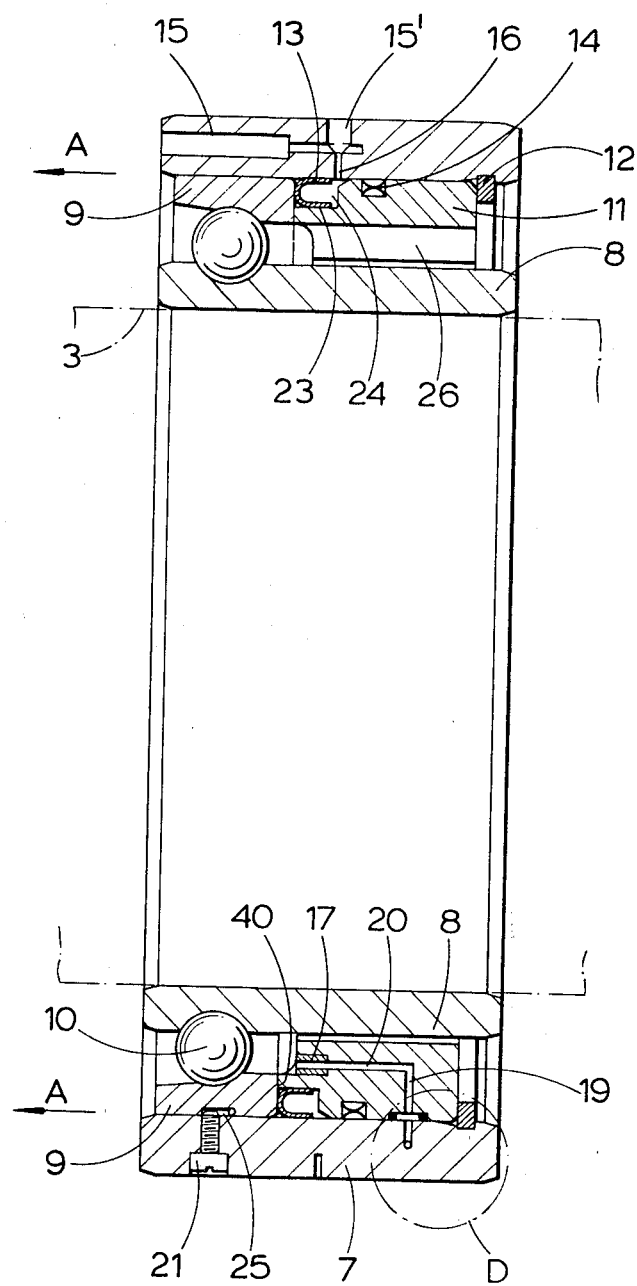
FIG. 2 is a sectional side view of the bearing unit used in the arrangement shown in FIG. 1, the view being taken on a somewhat larger scale.
Figure 3:
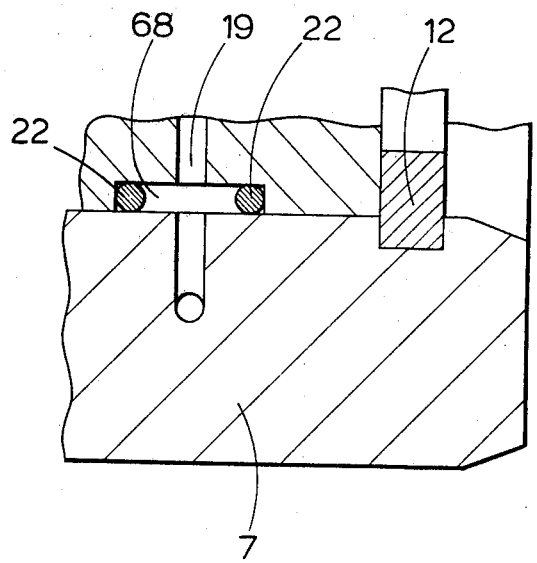
FIG. 3 is a scrap-view of part of the unit depicted in FIG. 1.

Referring initially to FIG. 1, the headstock of a machine tool, for example, includes a housing with front and rear walls 1, 2 respectively. A tool spindle 3 is supported for rotation in the housing by means of an angular-contact ball bearing assembly 4 of conventional type and by a bearing unit 5 constructed in accordance with the invention. The assembly 4, composed of two side-by-side bearings, is mounted in the front wall 1 while the unit 5 is mounted in the rear wall 2. The unit 5 is fitted directly into a bore 51 or hole in the wall 2 and engages on a retention ring 6 therein. The unit 5 is entirely self-contained and can be used in various different overall applications and constructions requiring variable axial pre-load of which FIG. 1 is merely illustrative. As shown in FIGS. 2 and 3, the unit 5 is composed of an external sleeve 7 made from hardened bearing steel, containing an angular-contact ball bearing with inner and outer races 8, 9, balls 10 and a cage (not shown). The inner race 8 which rotates with the spindle 3, is extended in width in relation to the outer race 9 and as illustrated the inner race 8 extends the whole width of the unit 5. The outer race 9 and the sleeve 7 are relatively displaceable in a direction parallel to the axis of the spindle 3 and a sliding contact is established between the external surface of the race 9 and the interior surface of the sleeve 7.

To inhibit rotation between the sleeve 7 and the race 9 while permitting axial movements, a screw 21 in the sleeve 7 engages in an axial slot 25 in the race 9. An annular block 11 is also received in the sleeve 7 and a ring 12 fitted into a groove in the interior surface of the sleeve 7 serves to retain the block 11 in the sleeve 7. A recess 23 is formed at the end of the block 11 remote from the ring 12 adjacent the interior of the sleeve 7. This recess 23 partly defines a presssure fluid-reception chamber 24. Bores 15, 15', 16 in the sleeve 7 serve to permit fluid to be conveyed to and from the chamber 24. The radial bore 16 leading to the chamber 24 communicates with a longitudinal or axial bore 15 and a radial bore 15'. This permits the fluid to be supplied from the radial or axial exterior of the unit 5 and the bore 15, 15' not used can serve to bleed the chamber 24 or can be blocked off. The radial bore 16 is smaller in cross-section than the bores 15, 15' to provide a restriction to fluid flow. A displaceable, resilient, annular seal 13 is disposed in the chamber 24. The seal 13 can be made from a suitable plastics material, e.g. PTFE, with a shaped spring steel insert therein or a spring steel component lined with such material. The seal 13 contacts the inner end face 40 of the race 9 and the seal 13 has a U-shaped cross-section open to receive fluid in the chamber 24. The limbs of the seal 13 are biased into sliding sealing contact with the inner axial surfaces of the sleeve 7 and the recess 23. The seal 13 may be of the type known as a "Shamban Vari-seal". A fixed seal 14, such as an O ring or a seal of the type known as "Shamban Quad Ring" is located in a groove in the outer surface of the block 11 to seal against the interior of the sleeve 7. During initial setting up the sleeve 7 would be adjusted in position relative to the spindle 3 to restrict the free axial movement of the spindle 3. Thereafter during operation fluid admitted to the chamber 24 will displace the seal 13 and the race 9 in direction of arrow A to provide a variable pre-load axial force on the bearing 8, 9. The seal 13 has a low sliding friction and forms a very effective self-sealing resilient annular piston.

The block 11 also contains bores 19, 20 which serve to convey lubricant to the bearing 8, 9, via a nozzle 17. An additional bore or bores in the sleeve 7 (not shown but similar to the bores 15, 15', 16) can supply the lubricant to the bores 19, 20. FIG. 3 shows the detail indicated by the circle D in FIG. 2. As shown in FIG. 3, O-rings 22 locate in a recess 68 in the block 11 to establish a seal between the lubricant supply bores of the sleeve 7 and the block 11.

Figure 4:
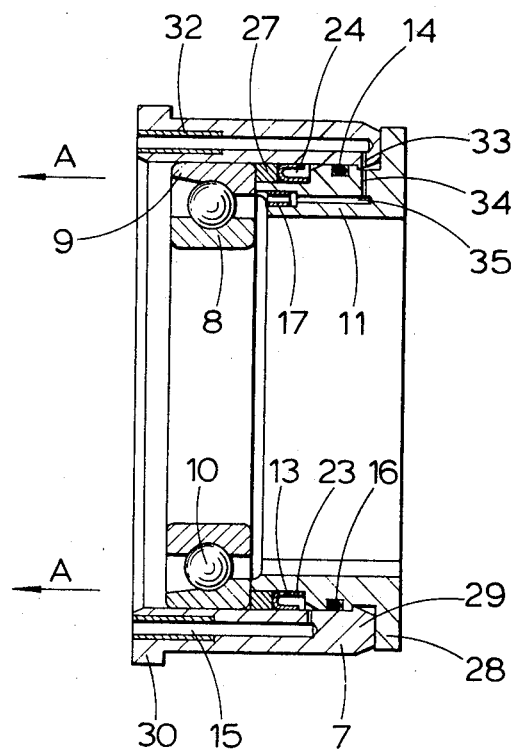
FIG. 4 is a sectional side view of another bearing unit constructed in accordance with the invention.
Figure 5:
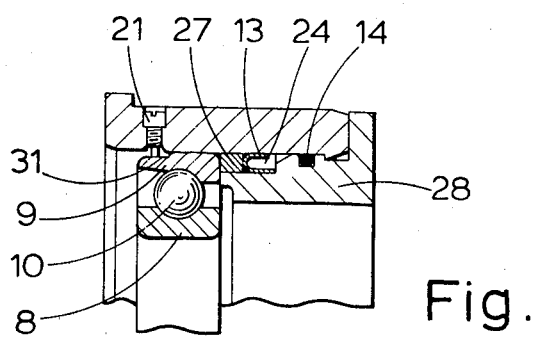
FIG. 5 is a scrap-view of part of the unit depicted in FIG. 4.

It is not necessary for the inner race 8 to be extended in relation to the outer race 9 in all cases and FIGS. 4 and 5 depict another unit with the bearing races 8, 9 of standard equal width. As shown in FIG. 4 a thrust ring 27 is positioned between the seal 13 and the outer race 9. The block 11 does not lie wholly within the sleeve 7 and moreover the block 11 is provided with a flange 28 which abuts a chamfered end 29 of the outer sleeve 7. The ring 12 is hence omitted.

The sleeve 7 is also provided with a flange 30 as the opposite end which serves to locate the sleeve 7 in the bore 51 in the housing wall 2. As shown in FIG. 5, the grub screw 21 which locks the sleeve 7 to the race 9 in the rotational sense here engages in a recess 31 extending from the outer end face of the race 9. The unit 5 shown in FIGS. 4 and 5 also employs a somewhat different form of lubrication and fluid supply system. As shown at the upper part of FIG. 4, the lubricant is supplied via a U-shaped path composed of a longitudinal bore 32 and a radial bore 33 in the sleeve 7 and a radial bore 34 and a longitudinal bore 35 in the block 11 and thence to the nozzle 17.

As shown at the lower part of FIG. 4, the pressure fluid for axially displacing the race 9 is conveyed via the longitudinal bore 15 and the smaller radial bore 16 in the sleeve as before.

In the embodiments of the invention described, the fluid admitted to the chamber 24 displaces the seal 13 and exerts an outward thrust-force directly on the bearing race 9. In the modified construction illustrated in FIG. 6, the fluid admitted to the chamber 24 provides a reactive force which displaces the race 9. As shown in FIG. 6, the block 11 has a significant cylindrical axial region 38 positioned between the sleeve 7 and the race 9 and extending outwardly beyond the flange 30 locating the sleeve 7 to the house wall 2. The block 11 has a radially-inwardly projecting flange 39 which engages the inner end face 40 of the race 9 and lies between the face 40 and radial flange 34 of the sleeve 7. The chamber 24 is positioned outside the sleeve 7 and the housing wall 2. As illustrated and by way of example a further component 41, which could be integral with the block 11, defines the chamber 24 in conjunction with the axial region 38 of the block 11 and an axial projection 42 of the sleeve 7. The component 41 has a radial end wall 47 acting as a shield. Sliding contact is established between the outer surface 43 of the region 38 of the block 11 and the inner surface 44 of the sleeve 7. The inner surface of the region 38 of the block 11 can make tight contact with the race 9 to restrain rotation. Further sliding contact is established between the outer surface 45 of the sleeve projection 42 and the inner surface 46 of the component 41. A coupling 47 mounted to the component 41 serves to convey pressure fluid directly to the chamber 24. Lubricant is supplied via a channel 48 in the wall 2 and complementary bores 49 in the sleeve 7 to the bearing 8, 9 as well as to the sliding surfaces 43, 44. An O-ring 50 in the outer surface of the sleeve 7 seals against the surface of the bore 51 in the housing wall 2. In contrast to the previously described arrangements where the block 11 and the sleeve 7 remain stationary while pre-load adjustment with the pressure fluid takes place in the unit shown in FIG. 6, the block 11 moves with the race 9. More particularly, pressure fluid supplied to the chamber 24 reacts against the resilient seal 13 to urge the block 11 and the race 9 in the direction of arrow A. The relatively long sliding surfaces 43, 44 and the sliding surfaces 45, 46 provide adequate guidance for the displacement.

In the similar construction depicted in FIG. 7, the sleeve 7 is replaced by a ring 52 resembling just the outer region 30, 42 of the sleeve 7 of FIG. 6 and the outer surface 43 of the axial region 38 is now in sliding contact with the surface of the bore 51 in the wall 2.

The lubricant is again supplied via the channel 48 in the wall 2 but the lubricant enters a recess 53 in the surface 43 of the region 38 of the block 11 and flows through bores 54 in a stepped end flange 55 of the block 11 to reach the bearing 8, 9. The O-ring 50 is now provided in the outer surface of this end flange 55 to engage with the surface of the bore 51.

Figure 8:
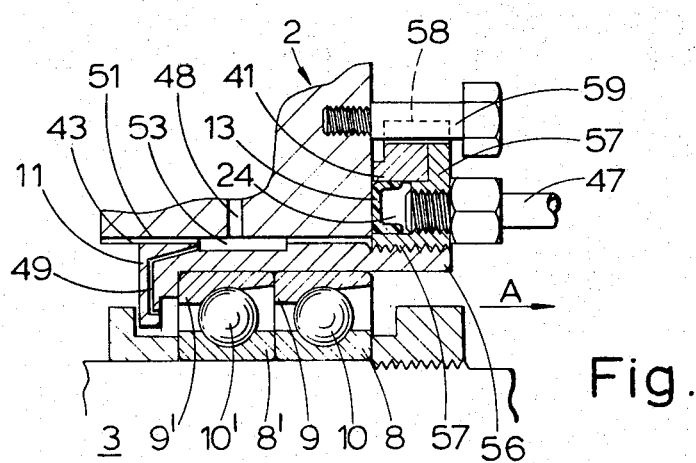

FIG. 8 depicts another unit which employs a pair of angular contact ball bearings 8', 9', 10' mounted side-by-side. The outer races 9, 9' are locked against rotation by the annular block 11 while the inner races 8, 8' rotate with the spindle 3. The block 11 again makes sliding contact with the bore 51 in the housing wall 2. The sliding surfaces can also be keyed.

The lubrication supply system may be as described in connection with FIG. 7. The block 11 has a screw-threaded external portion 56 which receives a screw-threaded ring 57 defining the chamber 24 with a further component 41 fitted to the wall 2. The seal 13 abuts directly on the wall 2. Provision is made to lock the ring 57 in its rotational position while permitting axial displacement. A series of spaced peripheral slots 58 in the ring 57 permits such locking with a screw 59 detachably fixed to the wall 2 and engaging through a keyway in the component 41. As before, fluid supplied to the chamber 24 via a coupling 47 on the ring 57 reacts against the seal 13 to move the ring 57 and the block 11 and the outer bearing races 9, 9' in the direction of arrow A. By adjusting the ring 57 on installation the pre-load range of control can be pre-determined.

Figure 9:
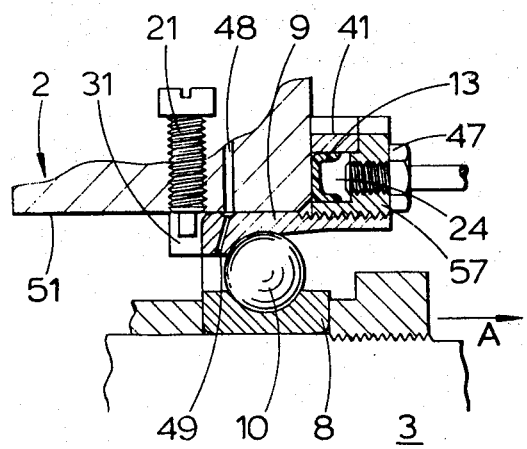
Figure 10:
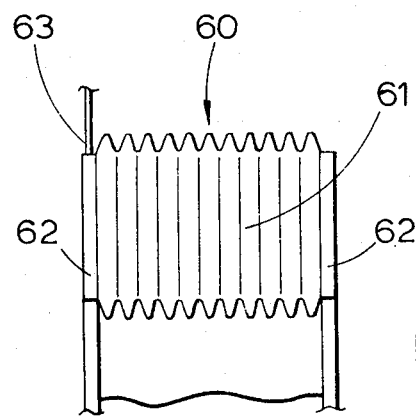
FIG. 10 is an illustration of annular bellows usable in the bearing units constructed in accordance with the invention.

FIG. 9 depicts a simplified form of unit which again utilizes the adjustment ring 57 but in this construction the ring 57 is in screw-threaded engagement with an extended outer race 9 of the bearing. This race 9 is in direct sliding contact with the bore 51 and lubricant can be supplied to the bearing via the channel 48, recess 53 and bore 49.

To prevent rotation of the outer race 9 a grub screw 21 accessible from the wall 2 engages in a slot or recess 31 in the race 9 as described hereinbefore. The ring 57 can be restrained from rotation in the manner shown in FIG. 8.

The resilient seal 13 employed in the various embodiments of the invention can be replaced by an analogous component and FIG. 19 shows annular bellows device 60 with a concertina-like expandable resilient annular centre section 61 between two end rings 62. Access to the interior of the section 61 is by way of a port or conduit 63 provided on one of the rings 62. The bellows 60 could be mounted in the chamber 24 in the embodiments of the invention described and illustrated. In contrast however, the pressure fluid would be admitted to the interior of the secton 61 rather than to the chamber 24 itself to force the end rings 62 apart. The bellows 60 can produce thrust force (FIGS. 1 to 5) or reactive force (FIGS. 6 to 9) to displace the race 9.

We claim:

1. A self-contained bearing unit for direct location in a bore of a housing wall of a machine tool to supplement another bearing or bearings in rotatably supporting a spindle; said unit comprising an angular-contact ball bearing with inner and outer races, the inner race being fixedly rotatable with the spindle, means for restraining the outer race against rotation while permitting axial displacement thereof relative to the inner race, means defining an annular pressure-fluid-reception chamber independent of the bore in the housing wall, means for permitting pressure fluid to be conveyed to said chamber, means for permitting lubricant to be conveyed to said bearing and a resiliently deformable annular U-shaped seal provided in the chamber, the seal being subjected directly to the pressure fluid conveyed to the chamber which exerts an axial displacement force on the outer race to pre-load the bearing.

2. A unit according to claim 1, wherein there are surfaces in sliding contact which are displaced relative to one another when the pre-load is adjusted and the means permitting the conveyance of lubricant includes a passage which also permits the lubricant to be conveyed to the sliding surfaces also.

3. A unit according to claim 1, wherein the seal moves within the chamber in the manner of a piston to transmit thrust force to the outer race.

4. A unit according to claim 1, wherein the seal serves to create reactive force to displace the outer race.

5. A unit according to claim 1 and further comprising a sleeve adapted for location in said bore, the sleeve surrounding the bearing and receiving the outer race for a relative limited sliding movement.

6. A unit according to claim 5, wherein the chamber is defined internally of the sleeve.

7. A unit according to claim 6 and further comprising an annular block retained within the sleeve with the chamber being defined by the block, the sleeve and the outer race.

8. A unit according to claim 7, wherein bores which form passages through which the lubricant and pressure fluid passes are provided in the block and the sleeve.

9. A unit according to claim 8, wherein said bores for conveying pressure fluid and lubricant include a bore which opens to an axial end face of the sleeve.

10. A unit according to claim 1 and further comprising a sleeve adapted for location in said bore and an annular block fixed to the outer race, the block and the sleeve at least partly defining said chamber externally of the sleeve and the bore, the sleeve and the block having surfaces in sliding contact such that the admission of pressure fluid moves the outer race and the block relative to the sleeve.

11. A unit according to claim 1 and further comprising an annular block adapted for location in said bore and surrounding the outer race, the block and the bore having surfaces in sliding contact, the annular block being fixed to the outer race and said chamber being defined externally of the bore such that the admission of pressure fluid moves the outer race and the block relative to the bore.

12. A unit according to claim 11, wherein the block is in screw-threaded engagement with an adjustment ring which partly defines said chamber and means is provided to permit the ring to be positionally adjusted relative to the block while inhibiting rotation of the ring.

13. A unit according to claim 1, wherein the outer race is received directly in the bore and the bore and the outer race have surfaces in sliding contact and wherein the outer race is in screw-threaded engagement with an adjustment ring which partly defines said chamber externally of the bore such that the admission of pressure fluid moves the outer race and the ring relative to the bore and wherein means is provided to permit the ring to be positionally adjusted relative to the outer race while inhibiting rotation of the ring.

14. A self-contained bearing unit for direct location in a bore of a housing wall of a machine tool to supplement another bearing in rotatably supporting a spindle, said unit comprising an angular-contact ball bearing with inner and outer races, the inner race being fixedly rotatable with the spindle means for restraining the outer race against rotation while permitting axial displacement thereof relative to the inner race; means defining a chamber independent of the bore in the housing wall, means for permitting lubricant to be conveyed to said bearing, an annular resilient bellows device disposed in the chamber and means for permitting pressure fluid to be conveyed into the bellows device to exert an axial displacement force on the outer race to pre-load the bearing.

* * * * *